United States Patent
Bullard et al.

(10) Patent No.: US 11,968,988 B1
(45) Date of Patent: *Apr. 30, 2024

(54) SYSTEM FOR INCREASING ANTIMICROBIAL EFFICACY IN A POULTRY PROCESSING TANK

(71) Applicant: Zee Company I, LLC, Chattanooga, TN (US)

(72) Inventors: Jonathon R. Bullard, Chattanooga, TN (US); James A. Faller, Chattanooga, TN (US); Robert C. Bullard, Signal Mountain, TN (US)

(73) Assignee: Zeco, LLC, Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,195

(22) Filed: Apr. 19, 2023

Related U.S. Application Data

(63) Continuation of application No. 17/805,263, filed on Jun. 3, 2022, now Pat. No. 11,659,844, which is a
(Continued)

(51) Int. Cl.
*A23B 4/08* (2006.01)
*A23B 4/06* (2006.01)
(Continued)

(52) U.S. Cl.
CPC ............. *A23B 4/08* (2013.01); *A23B 4/062* (2013.01); *A23B 4/20* (2013.01); *A23B 4/26* (2013.01); *A23V 2002/00* (2013.01)

(58) Field of Classification Search
CPC .. A23B 4/08; A23B 4/062; A23B 4/20; A23B 4/26
See application file for complete search history.

(56) References Cited

U.S. PATENT DOCUMENTS 2,347,434 A 4/1944 Reichert et al.
2,377,038 A 5/1945 Reichert et al.
(Continued)

FOREIGN PATENT DOCUMENTS

CA 2569025 6/2008
DK 84296 C 1/1958
(Continued)

OTHER PUBLICATIONS

Bauermeister, L.J. et al., "The Microbial and Quality Properties of Poultry Carcasses treated with Peracetic Acid as Antimicrobial Treatment", Department of Poultry Science. © 2008 Poultry Science Association, Inc. Accepted Jun. 13, 2008. 9 pages.
(Continued)

*Primary Examiner* — Stephanie A Cox
(74) *Attorney, Agent, or Firm* — DeWitt LLP

(57) ABSTRACT

Methods and related apparatus for improving the efficacy of antimicrobial agents within processing tanks. Processing tanks can include side streams for introducing antimicrobial agents into the processing tanks. The antimicrobial agents will be added and mixed in the side stream to form a processing solution. Additional actions can be conducted on the processing solution within the side stream including any and or all of heating, pumping, sampling, measuring, testing and pH adjustment of the processing solution. The processing solution is divided into at least two processing solution steams, which can be introduced at two different and distinct locations within the processing tank such as a carcass introduction end and a carcass removal end. By simultaneously introducing at least two processing solution streams at different locations of the processing tank, large concentration gradients of the antimicrobial agent are avoided.

50 Claims, 6 Drawing Sheets

Related U.S. Application Data continuation of application No. 15/676,622, filed on Aug. 14, 2017, now Pat. No. 11,350,640.

(60) Provisional application No. 62/374,468, filed on Aug. 12, 2016.

(51) Int. Cl.
  *A23B 4/20* (2006.01)
  *A23B 4/26* (2006.01)

(56) References Cited

U.S. PATENT DOCUMENTS

| | | |
|---|---|---|
| 2,512,640 A | 6/1950 | Greenspan et al. |
| 2,966,415 A | 12/1960 | Rinehart et al. |
| 3,104,170 A | 9/1963 | Mahon et al. |
| 3,104,978 A | 9/1963 | Elder |
| 3,122,417 A | 2/1964 | Blaser et al. |
| 3,234,140 A | 2/1966 | Irani et al. |
| 3,689,283 A | 9/1972 | May et al. |
| 4,675,947 A | 6/1987 | Clatfelter et al. |
| 5,069,922 A | 12/1991 | Brotsky et al. |
| 5,139,788 A | 8/1992 | Schmidt |
| 5,143,739 A | 9/1992 | Bender et al. |
| 5,200,189 A | 4/1993 | Oakes et al. |
| 5,208,057 A | 5/1993 | Greenley |
| 5,234,703 A | 8/1993 | Guthery |
| 5,283,073 A | 2/1994 | Bender et al. |
| 5,364,650 A | 11/1994 | Guthery |
| 5,435,808 A | 7/1995 | Holzhauer et al. |
| 5,462,713 A | 10/1995 | Schlitzer et al. |
| 5,489,434 A | 2/1996 | Oakes et al. |
| 5,567,444 A | 10/1996 | Hei et al. |
| 5,597,791 A | 1/1997 | Richards et al. |
| 5,632,676 A | 5/1997 | Kurschner et al. |
| 5,635,231 A | 6/1997 | Bender et al. |
| 5,674,538 A | 10/1997 | Lokkesmoe et al. |
| 5,718,910 A | 2/1998 | Oakes et al. |
| 5,720,983 A | 2/1998 | Malone |
| 5,863,244 A | 1/1999 | Manfield |
| 5,965,033 A | 10/1999 | Huss et al. |
| 6,008,405 A | 12/1999 | Gray et al. |
| 6,010,729 A | 1/2000 | Gutzmann et al. |
| 6,095,675 A | 8/2000 | Tai |
| 6,103,286 A * | 8/2000 | Gutzmann ............... A23B 4/24 426/321 |
| 6,113,963 A | 9/2000 | Gutzmann et al. |
| 6,183,807 B1 | 2/2001 | Gutzmann et al. |
| 6,284,719 B1 | 9/2001 | Simms |
| 6,342,528 B1 | 1/2002 | McKenzie et al. |
| 6,455,086 B1 | 9/2002 | Trinh et al. |
| 6,514,556 B2 | 2/2003 | Hilgren et al. |
| 6,518,419 B1 | 2/2003 | Van Der Lugt et al. |
| 6,527,872 B1 | 3/2003 | Fricker et al. |
| 6,534,075 B1 | 3/2003 | Hei et al. |
| 6,545,047 B2 | 4/2003 | Gutzmann et al. |
| 6,558,620 B1 | 5/2003 | Sanford et al. |
| 6,582,961 B1 | 6/2003 | Moon et al. |
| 6,605,253 B1 | 8/2003 | Perkins |
| 6,627,593 B2 | 9/2003 | Hei et al. |
| 6,627,657 B1 | 9/2003 | Hilgren et al. |
| 6,964,788 B2 | 11/2005 | Phebus et al. |
| 7,077,967 B2 | 7/2006 | Perkins et al. |
| 7,387,736 B2 | 6/2008 | Phillips et al. |
| 7,470,655 B2 | 12/2008 | Biering et al. |
| 7,498,051 B2 * | 3/2009 | Man ..................... C11D 3/3902 426/652 |
| 7,754,670 B2 | 7/2010 | Lange et al. |
| 7,767,240 B2 | 8/2010 | Howarth |
| 7,832,360 B2 | 11/2010 | Hilgren et al. |
| 7,887,641 B2 | 2/2011 | Man et al. |
| 8,020,520 B2 | 9/2011 | Hilgren et al. |
| 8,029,693 B2 | 10/2011 | Dada et al. |
| 8,030,351 B2 | 10/2011 | Gutzmann et al. |
| 8,043,650 B2 | 10/2011 | Gutzmann et al. |
| 8,057,812 B2 | 11/2011 | Man et al. |
| 8,128,976 B2 | 3/2012 | Man et al. |
| 8,246,758 B2 | 8/2012 | Man et al. |
| 8,372,461 B2 | 2/2013 | Bullard et al. |
| 8,877,254 B2 | 11/2014 | Li et al. |
| 8,916,510 B2 | 12/2014 | Gutzmann et al. |
| 9,414,609 B1 * | 8/2016 | Bullard .................. A23B 4/20 |
| 9,497,964 B2 | 11/2016 | Dagher et al. |
| 10,912,321 B2 | 2/2021 | Harvey et al. |
| 10,974,211 B1 | 4/2021 | Beason et al. |
| 11,350,640 B1 | 6/2022 | Bullard et al. |
| 11,659,844 B1 | 5/2023 | Bullard et al. |
| 11,839,858 B1 | 12/2023 | Beason et al. |
| 2001/0044401 A1 | 11/2001 | Perkins et al. |
| 2002/0072627 A1 | 6/2002 | Chandalia et al. |
| 2002/0083549 A1 | 7/2002 | Dieterman et al. |
| 2003/0047087 A1 | 3/2003 | Phebus et al. |
| 2003/0148727 A1 | 8/2003 | Hilgren et al. |
| 2003/0180385 A1 | 9/2003 | Martinelli et al. |
| 2003/0199583 A1 | 10/2003 | Gutzmann et al. |
| 2003/0200997 A1 | 10/2003 | Gill et al. |
| 2003/0211169 A1 | 11/2003 | Tabasso |
| 2005/0209120 A1 | 9/2005 | Reinhardt et al. |
| 2005/0245416 A1 | 11/2005 | Veening et al. |
| 2006/0113506 A1 | 6/2006 | Man et al. |
| 2006/0225439 A1 * | 10/2006 | Morris, III ............... A23B 4/06 62/375 |
| 2006/0286227 A1 | 12/2006 | Terry |
| 2007/0025897 A1 | 2/2007 | Rheingans et al. |
| 2007/0244261 A1 | 10/2007 | Fukui et al. |
| 2007/0269563 A1 | 11/2007 | Mixon et al. |
| 2007/0292580 A1 | 12/2007 | Gutzmann et al. |
| 2009/0043123 A1 | 2/2009 | Copenhafer et al. |
| 2009/0143481 A1 | 6/2009 | Man et al. |
| 2009/0145859 A1 | 6/2009 | Man et al. |
| 2009/0282847 A1 * | 11/2009 | Bullard .................. A23B 4/064 62/177 |
| 2009/0311134 A1 | 12/2009 | Iwashita et al. |
| 2009/0324790 A1 | 12/2009 | Hilgren et al. |
| 2010/0021557 A1 | 1/2010 | Li et al. |
| 2010/0075883 A1 | 3/2010 | Geret et al. |
| 2010/0092574 A1 | 4/2010 | Sweeny |
| 2010/0108942 A1 | 5/2010 | Man et al. |
| 2010/0196503 A1 | 8/2010 | Heisig et al. |
| 2010/0227000 A1 | 9/2010 | Ames et al. |
| 2010/0323037 A1 | 12/2010 | Curry et al. |
| 2011/0027383 A1 | 2/2011 | Hilgren et al. |
| 2011/0135534 A1 | 6/2011 | Bates et al. |
| 2011/0177145 A1 | 6/2011 | Erkenbrecher, Jr. et al. |
| 2011/0220155 A1 | 9/2011 | Man et al. |
| 2011/0274766 A1 | 11/2011 | Allen et al. |
| 2011/0305805 A1 | 12/2011 | Gutzmann et al. |
| 2011/0311691 A1 | 12/2011 | Gutzmann et al. |
| 2012/0165407 A1 | 6/2012 | Gupta et al. |
| 2012/0244261 A1 * | 9/2012 | Harvey .................. A23B 4/26 426/332 |
| 2012/0245228 A1 | 9/2012 | Harvey et al. |
| 2012/0322872 A1 | 12/2012 | Kraus et al. |
| 2013/0153516 A1 * | 6/2013 | Bullard ................... C02F 1/722 210/749 |
| 2013/0251819 A1 | 9/2013 | Knueven et al. |
| 2021/0205766 A1 | 7/2021 | Bullard et al. |

FOREIGN PATENT DOCUMENTS

| | | |
|---|---|---|
| EP | 0564250 A2 | 10/1993 |
| EP | 0564250 A3 | 10/1993 |
| EP | 0550137 | 12/1996 |
| EP | 0985349 | 3/2000 |
| EP | 1199931 | 7/2003 |
| EP | 1435203 | 7/2004 |
| GB | 947688 | 1/1964 |
| GB | 1456592 | 11/1976 |
| GB | 2289676 | 11/1995 |
| JP | H08165298 | 6/1996 |
| WO | WO9406294 | 3/1994 |
| WO | WO9421122 | 9/1994 |
| WO | WO9424869 | 11/1994 |

(56) References Cited

FOREIGN PATENT DOCUMENTS

| WO | WO9742984 | 11/1997 |
|---|---|---|
| WO | WO9900025 | 1/1999 |
| WO | WO0105255 | 1/2001 |
| WO | WO0237972 | 5/2002 |
| WO | WO0254866 | 7/2002 |
| WO | WO02060280 | 8/2002 |
| WO | WO03092919 | 11/2003 |
| WO | WO2006015626 | 2/2006 |
| WO | WO2007092087 | 8/2007 |
| WO | WO2009027857 | 3/2009 |
| WO | WO2009156972 | 12/2009 |
| WO | WO2012037294 | 3/2012 |

OTHER PUBLICATIONS

Li, Junzhong et al., File History of U.S. Appl. No. 61/427,952, filed Dec. 29, 2010, titled "In Situ Generation of Peroxycarboxylic Acids at Alkaline pH, and Methods of Use Thereof".

Alvarado, C. et al., "Marination to Improve Functional Properties and Safety of Poultry Meat", Department of Animal and Food Sciences. © 2007 Poultry Science Association, Inc. 15 pages.

Yuan, Z. et al., "Kinetics of Peracetic Acid Decomposition Part 1: Spontaneous Decomposition at Typical Pulp Bleaching Conditions", The Canadian Journal of Chemical Engineering. Vol. 75. Feb. 1997. 6 pages.

Baldry, M.G.C. et al., "The Activity of Peracetic Acid in Sewage Indicator Bacteria and Viruses", Wat.Sci. Tech, vol. 24, No. 2, pp. 353-357. © 1991.

Ercken,D. et al.., "Effects of Peracetic Acid and Monochloramine on the Inactivation of Naegleria Lovaniensis", Water Science Technology. vol. 47, No. 3, pp. 167-171. © 2003.

Schmidt, Ronald H.,"Basic Elements of Equipment Cleaning and Sanitizing in Food Processing and Handling Operations", University of Florida. 11 pages. Publication FS14, Dec. 12, 2018.

Artés, F. et al., "Improved Strategies for Keeping Overall Quality of Fresh-cut Produce", Proc. IC on Qual. Manag. Fresh Cut Produce. 2007, pp. 245-258.

Chandra, Sofia Santi, "Effects of Low-dose Gamma Irradiation, Chlorine, and Peroxyacetic Acid (PAA) on Fresh Sliced Radish", A Research Project, Submitted to the Graduate Faculty of Chapman University. Aug. 2004. 56 pages.

Ernst, C. et al., "Efficacy of Amphoteric Surfactant-and Peracetic Acid-Based Disinfectants on Spores of *Bacillus cereus* In Vitro and on Food Premises of the German Armed Forces", Journal of Food Protection. vol. 69, No. 7, pp. 1605-1610. 2006.

Rodrigues, Laura Beatriz, et al., "Quantification of Biofilm Production on Polystyrene by *Listeria, Escherichia coli and Staphylococcus aureus* Isolated From a Poultry Slaughterhouse", Brazilian Journal of Microbiology (2010) 41:1082-1085.

Sánchez-Ruiz, Concepción, et al., "An Evaluation of the Efficiency and Impact of Ray Wastewater Disinfection with Peracetic Acid Prior to Ocean Discharge", Wat. Sci. Tech. vol. 32, No. 7 pp. 159-166. 1995.

Trachoo, Nathanon, "Survival of *Campylobacter jejuni* in Biofilms Isolated from the Water System of a Chicken House", A Dissertation submitted to the Graduate Faculty of The University of Georgia in Partial Fulfillment of t he Requirements for the Degree Doctor of Philosophy. Athens, Georgia. 2001.

Vij, Shilpa, "New Sanitation Technologies", pp. 125-128 from Lecture Compendium: Advances in Cleaning and Sanitation in Food Industry, The Seventeenth Short Course, Centre of Advanced Studies, Division of Dairy Technology, National Dairy Research Institute, Mar. 3-23, 2004.

Bauermesiter, Laura J., et al., "Validating the Efficacy of Peracetic Acid Mixture as an Antimicrobial of Poultry Chillers", J. Food. Prot., vol. 71, No. 6. pp. 1119-1122. 2008.

Howarth, Jon, "Perasan® Efficacy Against *Listeria monocytogenes* and *E. coli* in 15% Salt Brine Solutions of 40°F", EnviroTech. Feb. 15, 2005.4 pages.

Baert, Leen, et al., "Efficacy of Sodium Hypochlorite and Peroxyacetic Acid to Reduce Murine Norovirus 1, B40-8, *Listeria monocytogenes*, and *Escherichia coli* O157:H7 on Shredded Iceberg Lettuce and in Residual Wash Water", Journal of Food Protection. vol. 27, No. 5 (2009). pp. 1047-1054.

Baldry, M.G.C., "The Bactericidal, Fungicidal and Sporicidal Properties of Hydrogen Peroxide and Peracetic Acid", Journal of Applied Bacteriology. pp. 417-423. 1983.

Burfoot, Dean, et al., "Reducing Microbial Counts on Chicken and Turkey Carcasses Using Lactic Acid", ScienceDirect. Food Control 22 (2011) pp. 1729-1735.

Dickens, J.A., et al., "Effects of Acetic Acid and Hydrogen Peroxide Application During Defeathering on the Microbiological Quality of Broiler Carcasses Prior to Evisceration", Poultry Science 76:657-660 (1997).

Dickens, J.A., et al., "The Effects of Extended Chilling Times with Acetic Acid on the Temperature and Microbiological Quality of Processed Poultry Carcasses", Processing and Products. Poultry Science 74:1044-1048 (1995).

Dorsa, Warren J., et al., "Long-Term Bacterial Profile of Refrigerated Ground Beef Made from Carcass Tissue, Experimentally Contaminated with Pathogens and Spoilage Bacteria after Hot Water Alkaline, or Organic Acid Washes", Journal of Food Protection, vol. 61, No. 12 pp. 1615-1622 (1998).

foodsmatter.com., www.foodsmatter.com/miscellaneous_articles/misc_articles/research/bleach_and_vinegar.html, "Improving Bleach's Bug-killing Potential". First published in Jul. 2009.

Gill, C.O., et al., "Effects of Peroxyacetic Acid, Acidified Sodium Chlorite or Lactic Acid Solutions on the Microflora of Chilled Beef Carcasses", International Journal of Food Microbiology 91 (2004) pp. 43-50.

Kemp, G. Kere, et al., "Acidified Sodium Chlorite Antimicrobial Treatment of Boiler Carcasses", Journal of Food Protection. vol. 63, No. 8 (2000) pp. 1087-1092.

Lillard, H.S., "Effect of Trisodium Phosphate of Salmonellae Attached to Chicken Skin", Journal of Food Protection. vol. 57, No. 6. pp. 465-469. Jun. 1994.

Peracetic Acid Technical Report, Peracetic Acid Processing, CAS No. 79-21-0, NOSB TAP Review Compiled by OMRI, Last updated Nov. 3, 2000 (7 pages).

*Zeco, LLC, d/b/a Zee Company* v. *Enviro Tech Chemical Services, Inc.*, Amended Complaint for Declaratory Judgement in the United States Direct Court Eastern Direct of Tennessee at Chattanooga, Case No. 1:21-cv-00079-CEA-CHS, Document 95, filed Aug. 30, 2022. 21 pages.

Simpson, Catherine A. et al. "Antimicrobial Ingredients" Chapter 14 from Ingredients in Meat Products, pp. 301-377 (2009).

Application and File History for U.S. Appl. No. 15/436,210 (now U.S. Pat. No. 10,974,211) filed Feb. 17, 2017, inventors Beason et al.

Labadie, J., et al., "Development of a New Technique of Obtaining Axenic Meat", European J. Appl. Microbiol. (1977), 4, 67-73.

Joeseph, Robin L.(editor), James, Christian, et al., "Meat Decontamination—The State of the Art", University of Bristol (1997), pp. 1,8-9, 12, 33-35, 38, 43, 64-91, 98-99, and 104-105.

Harris, D., et al., "Microbiological and Organoleptic Characteristics of Beef Trim and Gound Beef Treated with Acetic Acid, Latic Acid, Acidified Sodium Chlorite, or Sterile Water in a Simulated Commercial Processing Environment to Reduce *Escherichia coli* O157:H7 and *Salmonella*", Meat Science, 90 (2012) pp. 783-788.

Gusev, A.A., et al., "Peracetic Acid for Salmonella Decontamination of Poultry Carcasses", Veterinary Disease Control Review (2007), UDC 819.614.31:858/838, 4 pages.

Dorn, P., et al., Examination of *Salmonella* Decontamination of Broiler Carcasses (1988), and English Translation, 28 pages.

Carciofi, Bruno A.M., et al., "Water Uptake by Poultry Carcasses During Cooling by Water Immersion", Chemical Engineering and Processing: Process Intensification, vol. 46, No. 5 (2007) pp. 444-450.

Bell, Kristen Y., et al., "Reduction of Foodborne Micro-organisms on Beef Carcass Tissue Using Acetic Acid, Sodium Bicarbonate, and Hydrogen Peroxide Spray Washes", Food Microbiology (1997), 14, pp. 439-448.

(56) References Cited

OTHER PUBLICATIONS

Mohan, Anand, et al., "Role of Peroxyacetic Acid, Octanoic Acid, Malic Acid, and Potassium Lactate on the Microbiological and Instrumental Color Characteristics of Ground Beef", J. Food Science. vol. 77, No. 4, (2012), pp. M188-M193.

nationalchickencouncil.org, "Food Safety and Inspection in the U.S. Broiler Chicken Industry", (2013). http:///www.nationalchickencouncil.org/industry-issues/food-safety/ , 2 pages.

Quilo, S.A., et al., Microbial, Instrumental Color and Sensory Characteristics of Inoculated Ground Beef Produced Using Potassium Lactate, Sodium Metasilicate or Peroxyacetic Acid as Multiple Antimicrobial Interventions, Meat Science 84 (2010) pp. 470-476.

Russell, Scott M., "Solving The Yield/Pathogen Reduction Dilemma", Watt Poultry USA, Oct. 2007, pp. 30-34.

Application and File History for U.S. Appl. No. 15/676,622 (now U.S. Pat. No. 11,350,640) filed Aug. 14, 2017, inventors Bullard et al.

Bottemiller, Helena, "Russia Agrees to Lift Ban on U.S. Poultry Imports", FSN, Food Safety News., Jun. 25, 2010.

Young, L.L., et al., "Moisture Retention by Water and Air-Chilled Chicken Broilers During Processing and Cutup Operations", Poultry Science Association, Inc., (2004), pp. 119-122.

May, K.N., et al., "Effect of Phosphate Treatment of Carcass-Weight Changes and Organoleptic Quality of Cup-Up-Chicken", University of Georgia and Market Quality Research Division. (1962) pp. 24-32.

Application and File History for U.S. Appl. No. 17/805,263 (now U.S. Pat. No. 11,659,844) filed Jun. 3, 2022, inventors Bullard et al.

Application and File History for U.S. Appl. No. 17/207,248 (U.S. Publication No. 2021/0205766) filed Mar. 19, 2021, inventors Bullard et al.

Application and File History for U.S. Appl. No. 17/196,587 (will issue on Dec. 12, 2023 as U.S. Pat. No. 11,839,858), filed Mar. 9, 2021, inventors Beason et al.

* cited by examiner

SYSTEM FOR INCREASING ANTIMICROBIAL EFFICACY IN A POULTRY PROCESSING TANK

PRIORITY CLAIM

The present continuation application claims priority to U.S. application Ser. No. 17/805,263 filed Jun. 3, 2022, now U.S. Pat. No. 11,659,844 issued May 30, 2023, which claims priority to U.S. application Ser. No. 15/676,622 filed Aug. 14, 2017, now U.S. Pat. No. 11,350,640 issued Jun. 7, 2022, which 10 claims priority to U.S. Provisional Application No. 62/374,468 filed Aug. 12, 2016 and entitled "METHODS AND RELATED APPARATUS FOR MEASURING AND ADJUSTING PROCESSING SOLUTION pH FOR POULTRY PROCESSING", which is hereby incorporated by reference in its entirety.

TECHNICAL FIELD

The present invention is related to processing systems and related methods of operation during poultry processing. More specifically, the present invention is directed to methods and related apparatus for increasing antimicrobial efficacy during poultry processing by reducing concentration gradients of antimicrobial agents within a processing tank.

BACKGROUND

Commercial poultry processing plants include variety of processing and handling steps that can allow for the retention, transportation and transfer of bacteria from carcass to carcass throughout the processing plant. Of particular concern are human pathogenic microorganisms and those whose metabolism result in rapid spoilage of meat. These microorganisms, brought into the plant in or on live carcasses, are disseminated throughout the plant as the post-kill carcasses are handled by processing personnel, touch briefly together during traverse of the shackle lines, or are dipped for periods of time in various aqueous solutions, like scald baths and chill water.

In response to the presence of bacteria, most processing plants have implemented various processes that expose poultry carcasses to desirable antimicrobial chemistries in order to reduce bacterial populations on the carcasses. While prior chemistries including sodium hypochlorite, trisodium phosphate, various organic acids, ozone, chlorine dioxide and acidified sodium provided benefits, these older technologies suffered from undesirable effects and limitations. Newer antimicrobial chemistries include the use of peroxycarboxylic acids ("PCA"), such as peroxyacetic acid ("PAA"). PAA is a highly efficacious antimicrobial that was originally used as a hard surface sanitizer, but has more recently been recognized as possessing superior antimicrobial intervention chemistries for poultry carcasses. PAA provides a broad spectrum of kill of pathogenic and spoilage bacteria while producing no undesirable chemical by-products as the PAA degrades.

PAA, which is also sometimes called peracetic acid, is a peroxycarboxylic acid and is a well known chemical for its strong oxidizing potential, has the molecular formula $CH_3COOOH$, and has a molecular structure as follows:

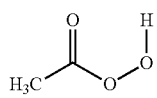

An equilibrium PAA solution is produced from an equilibrium mixture of hydrogen peroxide, acetic acid and water ("equilibrium PAA solution"), which often uses an acid catalyst, e.g., sulfuric acid.

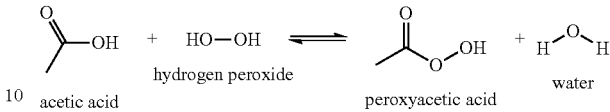

PAA has a pKA of about 8.4, such that about half the PAA is active (free) and about half is dissociated (bound) at a pH of about 8.4. For example, a 100 ppm solution of PAA at a pH of about 8.4 has about 50 ppm of active (free) PAA and about 50 ppm of peracetate ion, which is about 5 to about 10 times less effective than active PAA.

U.S. Pat. No. 5,632,676, which pertains to the application of equilibrium PAA solutions to fowl at an application concentration of about 100 ppm to about 2000 ppm, discloses such equilibrium solutions having a pH around 3.

Hydrogen peroxide is always present in excess in the natural equilibrium formulation of PAA solutions (and other equilibrium PCA solutions). Both the excess hydrogen peroxide and the PCA produced in the equilibrium PCA solution (such as PAA) are the sources of the oxidative chemistry that can create undesirable organoleptic effects on poultry skin and flesh, such as extremity darkening and skin bleaching. To mitigate the development of these undesirable effects, processing plants have reduced either concentrations of equilibrium PAA solutions (and other equilibrium PCA solutions) or restricted contact times.

U.S. Pat. No. 5,632,676 includes numerous examples of equilibrium PAA solutions and concludes that the examples show that effective sanitation occurs within a narrow peracetic acid concentration range. This patent also discusses bleaching that is apparent in unadjusted or NaOH adjusted PAA solutions compared to a solution adjusted to pH 5 with disodium phosphate. Published Patent Application No. 2012/0244261 also discusses providing a solution of PAA-containing water in a reservoir, measuring the pH in the reservoir, and then pH adjustment before processing with a source of alkali, pH determination in the reservoir during processing with pH adjustment as necessary during processing with a source of alkali to increase the weight of the processed poultry product, with the alkali adjusted PAA solutions having a pH between about 6 to about 9 in the processing reservoir before processing begins and during the processing.

Because of the importance of pH in driving the equilibrium equation to proper concentrations of PAA, it would be advantageous to improve upon the accuracy of pH measurement and consistency within of pH within the processing systems. It would also be advantageous to properly monitor and maintain the pH of PAA during processing to determine the proper active PAA compared to peracetate ions in the solution during processing. Still further, due to the amount of organic material in the processing tank, it would be advantageous to have accurate monitoring of the pH of the processing solution without having to routinely clean the pH probes that can be fouled by the organic material. Finally, it would be advantageous to improve upon existing processing systems so as to reduce concentration gradients across a processing tank, as well as to increase the antimicrobial efficacy of intervention processing solutions in processing tanks.

SUMMARY

Various aspects of the present invention include both methods and related apparatus as well as systems for improving the efficacy of antimicrobial agents within processing tanks. Typically, methods, apparatus and systems of the present invention will involve the use of side streams to add appropriate antimicrobial agents into the processing tanks. Within these side streams, the antimicrobial agents will be added to a source solution and mixed to form a processing solution within the side stream. In some embodiments, the source solution is fresh water, while in some other embodiments the source solution may be a recycled, reclaimed and/or reused processing solution comprising one or more intervention solution components, such as a peroxycarboxylic acid, PAA, sodium hypochlorite or other processing chemistries. Depending upon the application, additional actions can be conducted on the processing solution within the side stream including any and or all of heating, for example, with heat exchangers, pumping, sampling, measuring, testing and/or pH adjusting the processing solution.

The invention may generally further comprise the processing solution having at least two distinct streams, for example, a first and second processing solution stream, wherein the at least two distinct streams will be introduced at two different and distinct locations within the processing tank. For instance, the first processing solution stream can be introduced proximate a carcass introduction location of the processing tank, while the second processing solution stream can be simultaneously introduced at a carcass removal location of the processing tank. In some embodiments, the first and second processing streams are provided by separate processing stream sources. For instance, the first processing stream may be a source of fresh water mixed with an intervention chemistry, while the second processing stream may be a recycled, reclaimed or reused processing source mixed with an intervention chemistry. In some other embodiments, a single processing solution is provided that can be divided into the first and second processing streams. In some embodiments, the processing solution can be divided into additional streams that can be introduced at various locations between the carcass introduction location and the carcass removal location of the processing tank. By simultaneously introducing at least two processing solution streams at different locations of the processing tank, large concentration gradients can be avoided with the processing tank such that each animal carcass is exposed to sufficient amounts of the antimicrobial agent across a length of the processing tank. Furthermore, reduced amounts of antimicrobial agent can be utilized as there is no longer the necessity to add excessive amounts of the antimicrobial agent at an upstream side of the processing tank to ensure that adequate levels of the antimicrobial agent are present at the downstream side. Various aspects of the present invention have been found to be especially useful when the processing tank comprises a poultry chiller tank for cooling poultry carcasses.

In another aspect, the present invention improves upon pH control and consistency within processing systems having an antimicrobial solution by adding a pH adjusting product and/or peroxycarboxylic acids, such as PAA, to the inlet piping system or to a tank in a side or ancillary system, such that the pH adjusting product is thoroughly mixed with the peroxycarboxylic acid prior to its introduction into a processing tank system, such as a chiller tank.

In some embodiments, the ancillary system can comprise one or more of the various piping of the processing tank system, for example, inlet flow piping, makeup flow piping, and tank recirculation piping. In such aspects, the processing water can have a pH between about 7 and 12 prior to addition of the peroxycarboxylic acid, in other aspects a pH between about 7.5 and 9. Once the peroxycarboxylic acid is added to the processing water, the solution is thoroughly mixed before pH determination and introduction of the processing solution into the processing tank.

In some other embodiments, the ancillary system can comprise one or more stand-alone tanks, for example, a mixing tank or similar reservoir, which supplies the processing solution having the desired pH to the processing tank system. Through the mixing of the processing water with the peroxycarboxylic acid and pH determination in an ancillary system, pH need only be measured once (in the ancillary system) as the velocity of the water in the ancillary system (either piping or stand-alone mixing tank) and the associated high Reynolds number, resulting in the processing solution having the desired pH between about 7 and about 12, in some other instances between about 7.5 and 11, and other instances between about 8.0 and 10.0, being thoroughly mixed prior to being introduced into the process tank. As all of the water entering the tank (either incoming, rinse, or recirculation) is at the same pH, consistent pH contacts each poultry carcass as the birds travel from a front end to a back end of the processing tank.

In some embodiments, the pH of the processing solution can also be determined in the overflow of the processing tank. As all of the water entering the tank travels from the front end to the back end of the processing tank, the overflow at the back end of the processing tank will provide an accurate pH determination after the carcasses travel the entire distance of the processing tank. In other words, determining the pH of the processing solution after it exits the processing tank will provide a more accurate determination of the pH than in the tank itself where processing has not been completed or organic material can build-up.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
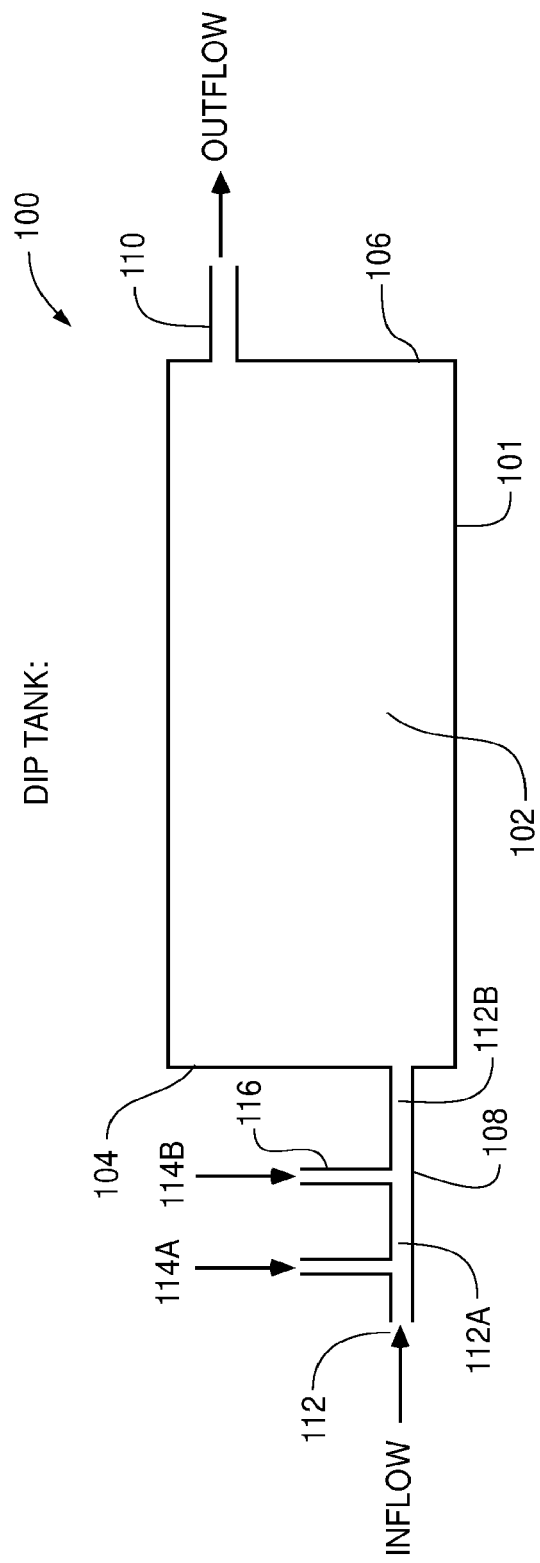
FIG. 1 is a schematic illustration of a poultry carcass dip tank according to a representative embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Representative embodiments of the present invention provide methods and systems for improving the efficacy of antimicrobial agents in processing tanks by eliminating large concentration gradients across the length of the processing tank. In some embodiments, the invention can include consistently exposing poultry carcasses to a process solution having a similar concentration prior to introduction into a first end of a processing tank and upon exiting a second end of a processing tank. While the processing solution of the present invention is discussed in reference to a peroxycarboxylic acid, such as PAA, one of ordinary skill in the art will appreciate that the present invention is applicable to one or more antimicrobial components used in processing poultry.

In some embodiments, the invention can include consistently exposing poultry carcasses to process solution having similar pH prior to introduction into a first end of a processing tank and upon exiting a second end of a processing tank. Representative embodiments of the present invention utilize one or more ancillary systems for introducing a processing solution having at least one peroxycarboxylic acid in a processing water having a pH of about 7 to about 10 that is thoroughly mixed prior to introduction into the processing tank, such that the processing tank will not experience zones having different pH levels. In some embodiments, the ancillary system can comprise a piping inlet or piping recirculation loop in which the peroxycarboxylic acid is added to a processing water having a desired pH and thoroughly mixed prior to its introduction to the processing tank. In some embodiments, the ancillary system can comprise a storage tank or similar style reservoir into which the peroxycarboxylic acid is added to the processing water having a desired pH and mixed prior to its introduction to the processing tank. In some aspects, a pH adjustment component may need to be added to either the processing water or processing solution in the ancillary system to obtain the desired pH of the processing solution. Regardless of the design, the ancillary system will have high velocities and corresponding high Reynolds numbers such that the processing water, peroxycarboxylic acid, and any pH adjustment product is adequately mixed providing a processing solution having a desired pH and concentration of the peroxycarboxylic acid, such as PAA, prior to introduction into the processing tank. The present invention can further include measuring the pH within the ancillary system to accurately determine pH prior to introduction into the processing tank and without concern for fouling of a pH probe that is a common occurrence due to organic material from carcasses within the processing tank itself.

In a first embodiment as illustrated in FIG. 1, a poultry processing system 100 of the present invention can comprise a process tank 101 such as, for example, a dip tank including a processing solution 102. The processing solution 102 generally comprises a processing water containing a peroxycarboxylic acid, preferably PAA, wherein the processing water was provided at a desired pH that is advantageous for processing and rinsing poultry carcasses and mixed with the peroxycarboxylic acid prior to being provided in the process tank 101. The process tank 101 generally comprises a first end 104 and a second end 106, wherein an inflow pipe 108 introduces the processing solution 102 into the process tank 101 and an outflow pipe 110 removes the processing solution 102 from the process tank 101.

As illustrated in FIG. 1, the inflow pipe 108 can comprise an ancillary water inflow portion 112, and one or more ancillary systems 114a and 114b can be used to supply a pH adjustment product and intervention chemistry, such as peroxycarboxylic acid, preferably PAA, to the inflow pipe 108 prior to the processing solution being introduced into the process tank 101. For example, the inflow pipe 108 can comprise a water supply 112 into which the pH adjustment product is directly added by ancillary system 114a, to the extent necessary, to provide a processing water. The processing water having the desired pH can then have the intervention chemistry, such as peroxycarboxylic acid, preferably PAA, added by ancillary system 114b. For example, the pH of the water inflow supply 1122 can be measured such that the pH adjustment product can be added to the water supply 112 through the use of a conventional metering pump or through a venturi injector or the like to obtain the desired pH of the processing water, preferably between about 7 and about 10. Generally, the flow of the water supply 112 with respect to ancillary system 114a should have a high enough velocity and correspondingly, Reynolds number to thoroughly mix the pH adjustment product into the water supply 112 to provide a processing water 112a having the desired pH before it is introduced into the inflow pipe 108. The pH of the supply water 112 and/or the processing water 112a can be determined in the inflow pipe 108 prior to the introduction of any intervention chemistry, such as peroxycarboxylic acid. Similarly, the flow of the processing water 112a having the desired pH with respect to ancillary system 114b should have a high enough velocity and correspondingly, Reynolds number to thoroughly mix the intervention chemistry, such as peroxycarboxylic acid, preferably PAA, into the processing water 112a to provide a processing solution 112b before it is introduced into the inflow pipe 108. The pH of the processing solution 112b can be measured in the inflow pipe 108 prior to the introduction of the processing solution 112b into the processing tank 101 to confirm the desired pH of the processing solution 112b. Alternatively, the pH of the processing water 112a and the processing solution 112b can both be measured in the inflow pipe 108.

Alternatively, ancillary system 114a can comprise a mixing tank or similar reservoir into which the pH adjustment product is added to a water supply and thoroughly mixed before being introduced into the inflow pipe 108. Similarly, ancillary system 114b can comprise a tank or similar reservoir of the intervention chemistry. In this way, the pH of the processing water 112a is precisely controlled and maintained as the inflow pipe 108 delivers the processing solution 112b into the first end 104 of the process tank 100. Since the processing solution 112b contains the processing water 112a at a desired pH thoroughly mixed with the intervention chemistry, the pH of the processing solution 112b will be consistent prior to introduction into the processing tank 101. As such, pH will remain consistent throughout the process tank 101 and there will not be localized areas of higher or lower pH within the process tank 101 as a result of mixing the components within the process tank 101 that would limit the effectiveness of the processing solution in rinsing, chilling or otherwise treating the poultry carcasses. Furthermore, pH can be monitored in either the inflow pipe 108 or the ancillary systems 112a, 112b such that a pH probe/sensor is not exposed to potential fouling within the process tank 101.

Figure 2:
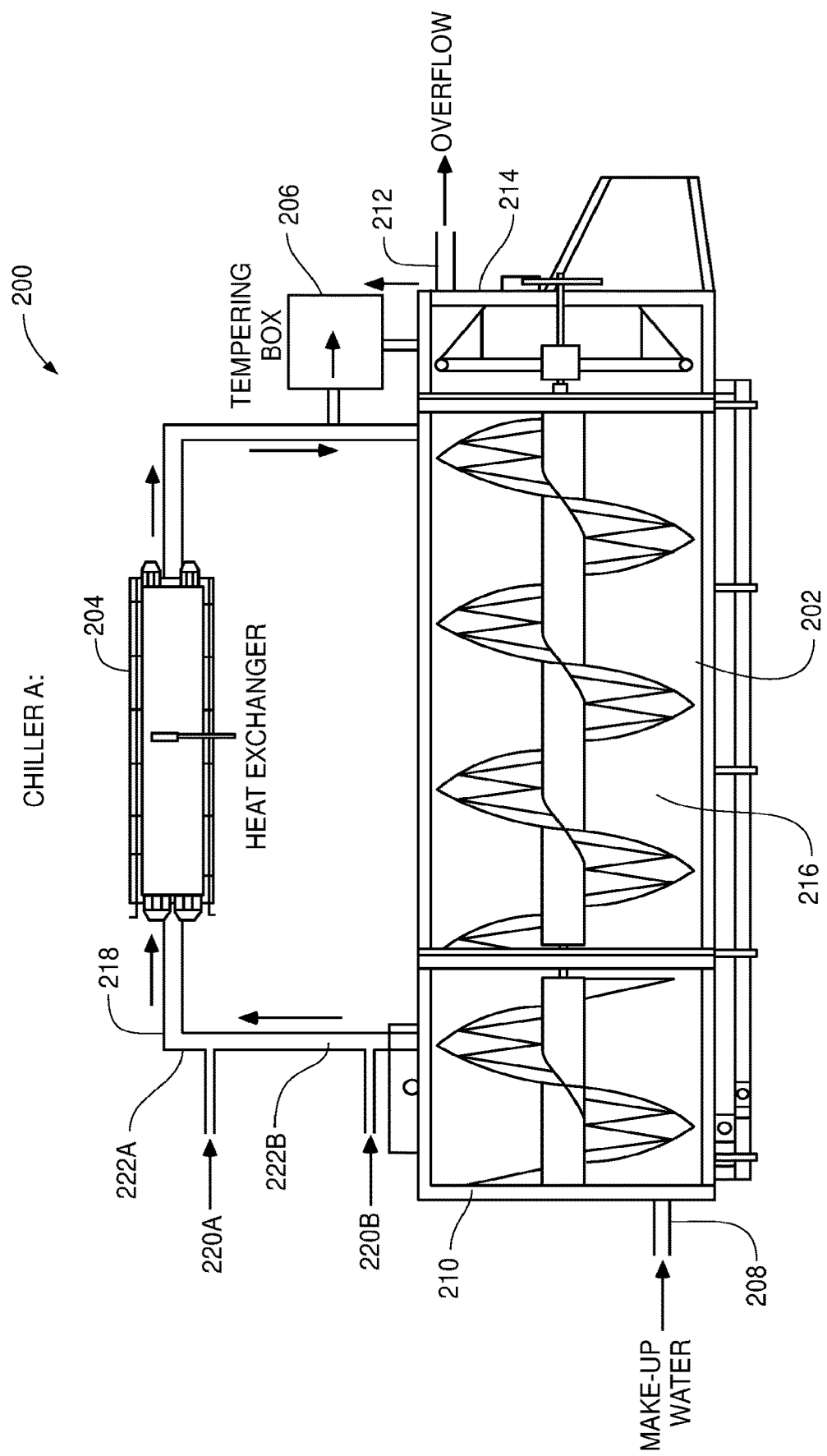
FIG. 2 is a schematic illustration of a poultry carcass water chiller tank with red water loop system according to a representative embodiment of the present invention.
Figure 3:
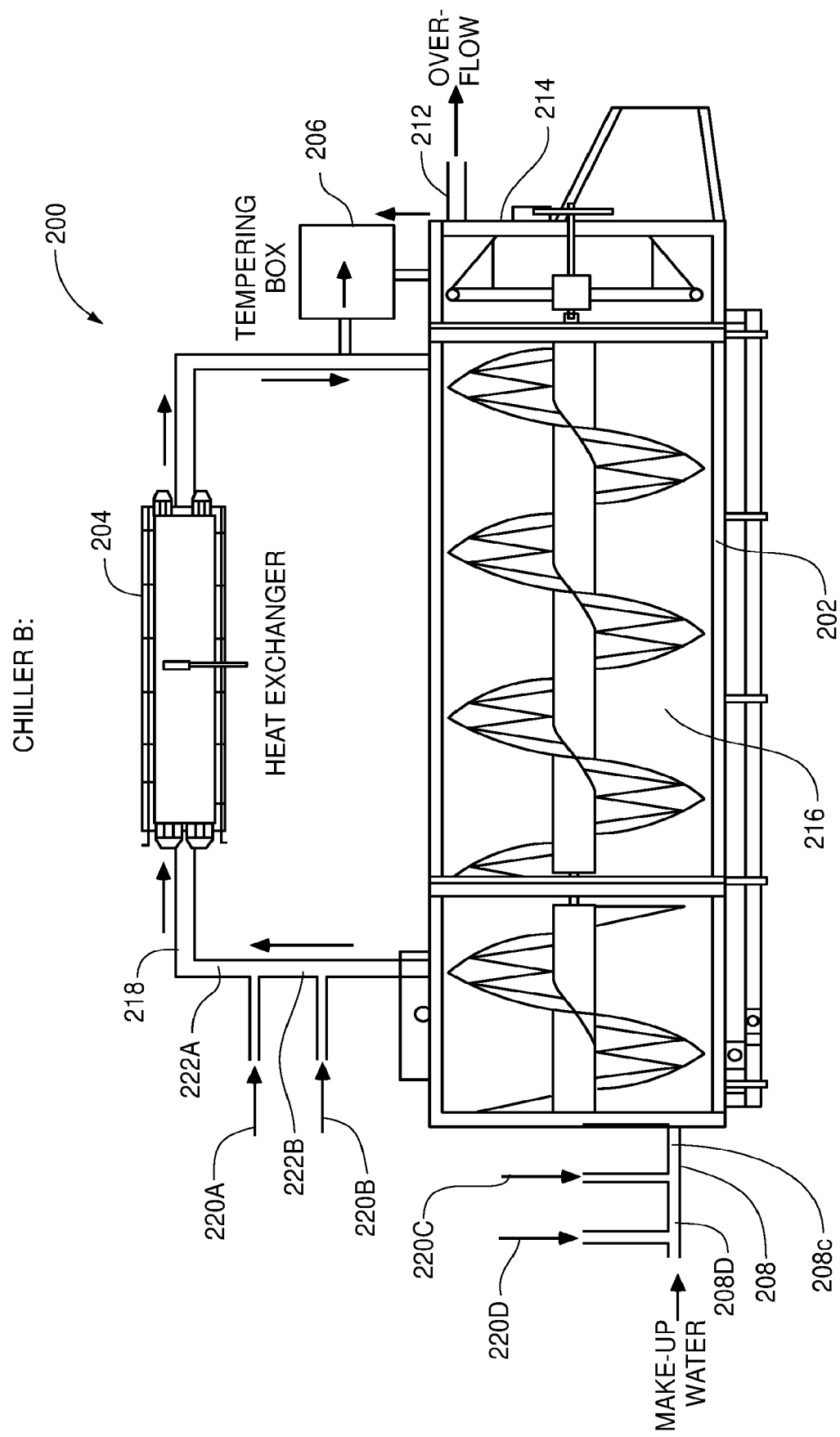
FIG. 3 is a schematic illustration of a poultry carcass water chiller tank red water loop system according to a representative embodiment of the present invention.
Figure 4:
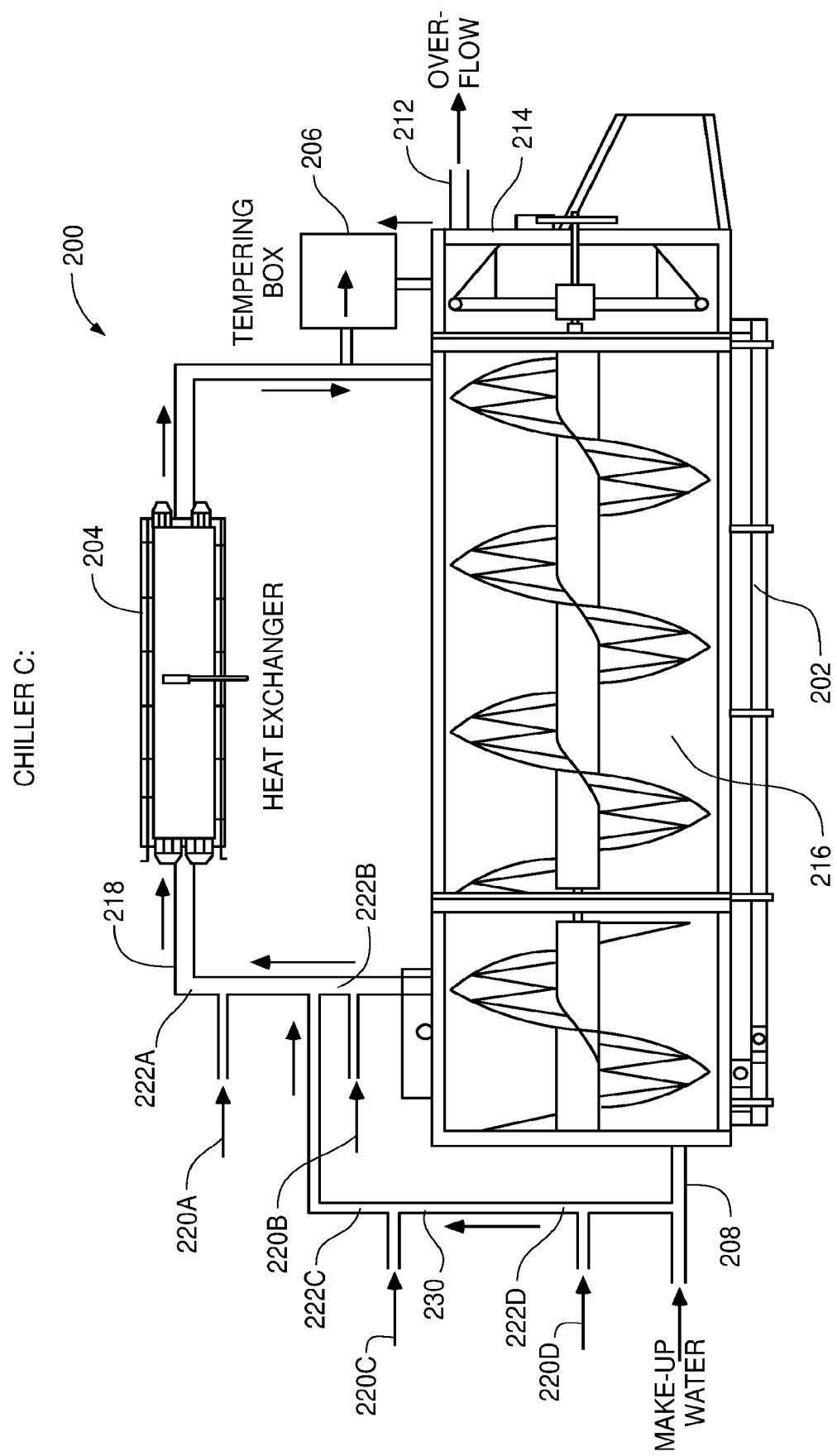
FIG. 4 is a schematic illustration of a poultry carcass water chiller tank red water loop system according to a representative embodiment of the present invention.

With reference to FIGS. 2, 3 and 4, various embodiments of a chiller tank with red water loop processing system 200 are illustrated. As will be described, the water chiller tank with red water loop processing system 200 can comprise varying levels of complexity based upon specific processing conditions, and as such, a variety of methods and system designs can be implemented to control pH within the water chiller tank with red water loop processing system.

In all of the illustrated embodiments, the chiller tank with red water loop processing system 200 comprises chiller tank 202, a heat exchanger 204 and an optional tempering box 206. In each of the embodiments, a make-up water stream 208 is supplied to a first end 210 of the chiller tank 202 while an overflow stream 212 is removed at a second end 214 of the chiller tank 202. In order to maintain temperature of a pH adjusted processing solution 216 within the chiller tank 202, a red water recirculation loop 218 supplies pH adjusted processing solution 216 from the chiller tank 202 to the heat exchanger 204, wherein the temperature of the pH adjusted processing solution is modified to the desired temperature and subsequently returned to the chiller tank 202.

With reference to FIG. 2, one or more ancillary systems 220a, 220b can supply the intervention chemistry and pH adjustment product and into the recirculation loop 218, wherein the processing solution 216 is thoroughly mixed and at the desired pH and temperature prior to introduction into the chiller tank 202. For example, ancillary system 220b can comprise a processing water supply having a pH adjustment product or the pH adjustment product that is directly added to the recirculated processing solution 216 in the red water recirculation loop 218. For example, the pH adjustment product can be added to the recirculated processing water through the use of a conventional metering pump or through a venturi injector or the like. Generally, the flow of the recirculated processing water in ancillary red water recirculation loop 218 should have a high enough velocity and correspondingly, Reynolds number to thoroughly mix the pH adjustment product into the recirculated processing water before it is introduced into the heat exchanger and chiller tank 202. Alternatively, ancillary system 220b can comprise a mixing tank or similar reservoir into which the pH adjustment product is added and thoroughly mixed with a water supply to provide a processing water supply 220b before being introduced into the red water recirculation loop 218. In this way, the pH is precisely controlled and maintained as the red water recirculation loop 218 delivers the pH adjusted processing solution 216 into the chiller tank 202. Similarly, the flow of the recirculated processing water 222b having the desired pH with respect to ancillary system 220b should have a high enough velocity and correspondingly, Reynolds number to thoroughly mix the intervention chemistry, such as peroxycarboxylic acid, preferably PAA, into the recirculated processing water 222b to provide a refreshed processing solution 222a having a desired concentration before it is introduced back into the chiller tank 202. The pH of the processing solution 222b can be measured in the inflow pipe 218 prior to the introduction of the processing solution 222a into the chiller tank 202 to confirm the desired pH of the processing solution 222a. Alternatively, the pH of the recirculated processing water 222b and the processing solution 222b can both be measured in the inflow pipe 218.

In a variation to the embodiment shown in FIG. 2, the chiller tank with red water loop processing system 200 of FIG. 3 can comprise additional ancillary systems 220c, 220d that supply the intervention chemistry and pH adjustment product, respectively, into the make-up water stream 208, such that the processing solution 216 is added at the first end 210 of the chiller tank 202 in a manner similar to that as previously described with respect to the processing solution 112b of the poultry processing system 100. In this manner, the processing solution 208c having the desired pH and intervention chemistry concentration is added to the chiller tank 202 at the first end 210 to provide a processing solution 216 within the chiller tank 202.

Finally in the embodiment illustrated in FIG. 4, the chiller tank with red water loop processing system 200 can further comprise a bypass loop 230 that introduces additional residence time and consequently, mixing of the pH adjustment product before it is introduced into the chiller tank 202. As illustrated, the bypass loop 230 can fluidly interconnect the make-up water stream 208 with the recirculation loop 218. In this way, one or more ancillary systems 220a, 220b, 220c, 220d can be utilized to introduce the intervention chemistry (220a, 220c) and pH adjustment product (220b, 220d) at an advantageous location prior to its introduction into the chiller tank 202. For example, ancillary systems 220d can be utilized to supply the pH adjustment product directly into the water within the bypass loop 230, while ancillary system 220b can supply the pH adjustment product into the recirculation loop 218 at a point upstream of the connection to the bypass loop 230. In an embodiment, ancillary system 22c can add intervention chemistry to the processing water 222d to provide a processing solution 222c before being introduced into the recirculation loop 218. In yet another alternative embodiment, ancillary system 220a can add all or additional intervention chemistry to the recirculation loop 218 at a point downstream of the connection to the bypass loop 230 containing processing solution 222c and recirculated processing solution 222B. The location of the ancillary systems in the chiller tank processing system 200 can be advantageously selected to make use of high velocities and Reynolds numbers to thoroughly mix the pH adjustment product and/or intervention chemistries prior to its introduction and/or reintroduction into the chiller tank 202.

In all of the variations of the chiller tank with red water loop processing system 200 described herein, a pH sensor/probe can be positioned in locations remote from the chiller tank 202. For example, the make-up water stream 208, the recirculation loop 218 and/or the bypass loop 230 can contain pH sensor/probes that are not exposed to fouling and/or contamination that can result from exposure to poultry contaminants within the chiller tank 202. Further, the pH sensor/probes can be located after the pH adjustment product is added to provide the processing water and/or after the intervention chemistry to provide the processing solution. In this way of the pH sensor/probes maintained outside of the chiller tank, maintenance is eliminated or otherwise reduced and operators can have a higher level of confidence that pH of the processing solution and concentration of intervention chemistry is at the desired levels before being introduced into the chiller tank 202.

In each of the embodiments shown in FIGS. 1-4, the overflow 110, 210 can also have pH probe/sensors to precisely determine the pH of the processing solution 102, 216 after it exits the respective tank. By determining the pH of the processing solution after it exits the tank, the amount of active PAA can be determined as a result of the organic material in the tank, which may determine the pH level and amount of intervention chemistry in the inlet prior to being introduced into the tank.

In certain embodiments, the peroxycarboxylic acid has from 2 to 12 carbon atoms. In some aspects, the PCA solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic and peroxysubric acid and mixtures thereof.

In some aspects, the processing solution in the inlet or red water recirculation loop prior to introduction into the tank has a pH above 7.0 and below 10, in other aspects between about 7.5 and about 9.5 and in other aspects between about 7.2 and 8.6.

In certain aspects, the processing solution has a concentration of peroxycarboxylic acid from about 1 ppm to about 5000 ppm, preferably from about 5 ppm to about 1000 ppm, preferably from about 10 ppm to about 200 ppm, and more preferably from about 15 ppm to about 100 ppm. In some aspects, the concentration of active peroxycarboxylic acid in the processing solution is from about 1 ppm to about 5000 ppm, preferably from about 5 ppm to about 1000 ppm, preferably from about 10 ppm to about 200 ppm, and more preferably from about 15 ppm to about 100 ppm. In some other aspects, the concentration of active peroxycarboxylic acid and active peroxycarboxylic acid ion in the processing solution is from about 1 ppm to about 5000 ppm, preferably from about 5 ppm to about 1000 ppm, preferably from about 10 ppm to about 200 ppm, and more preferably from about 15 ppm to about 100 ppm. In some aspects, the concentration of the PAA in the processing solution is between about ppm and about 100 ppm, preferably between about 15 ppm and about 75 ppm, and in some other aspects between about 20 ppm and 50 ppm.

In certain aspects, the poultry tank design of the present invention having at least a first and a second processing stream is capable of maintaining less than about a 10 ppm concentration gradient across the processing length of a processing tank, in some aspects less than about an 8 ppm concentration gradient, less than about 6 ppm concentration gradient, less than about 5 ppm concentration gradient, less than about 4 ppm concentration gradient, and in other aspects less than about a 3 ppm concentration gradient across the processing length of the processing tank. In certain aspects, the concentration gradient across the processing length of the processing tank of the present invention is between about 1 ppm and about 10 ppm, between about 2 ppm and 8 ppm, and in some other aspects between about 3 ppm and 5 ppm.

Testing

Figure 5A:
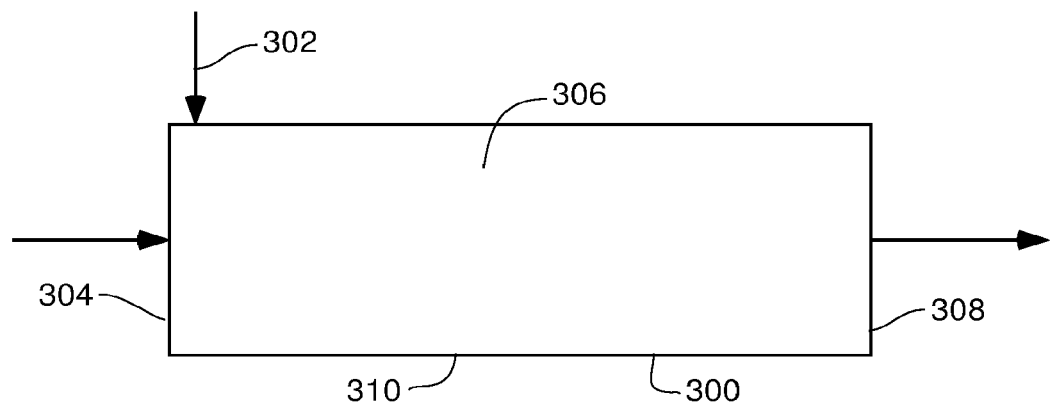
FIG. 5A is schematic illustration of a poultry carcass water chiller tank according to the prior art.
Figure 5B:
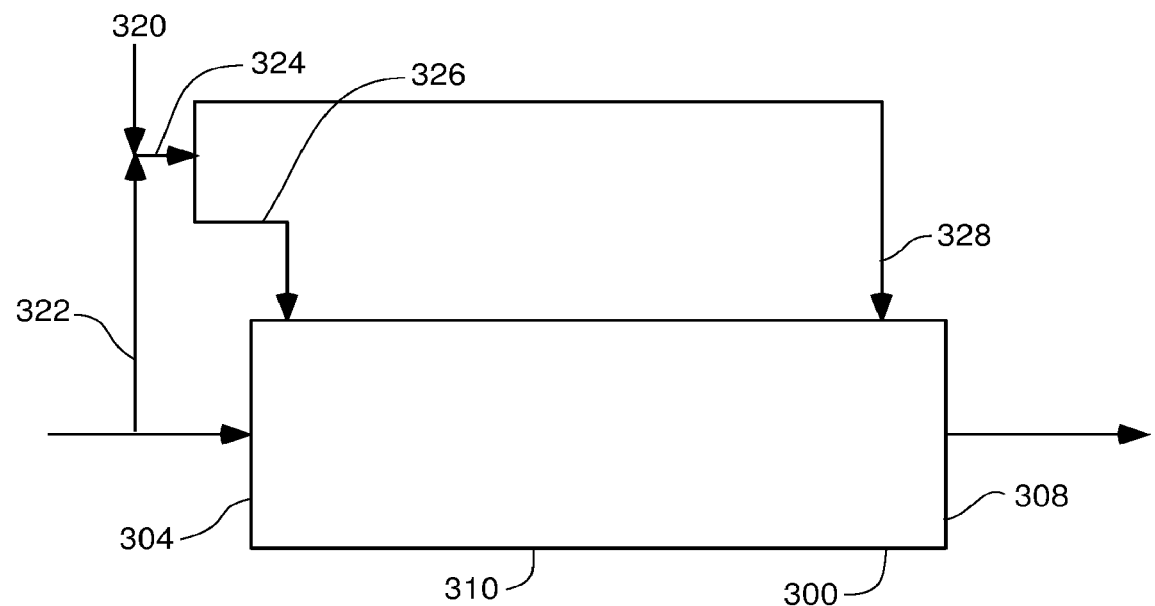
FIG. 5B is a schematic illustration of a poultry carcass water chiller tank according to a representative embodiment of the present invention.

In order to evaluate the efficacy of the present invention, a test was conducted to compare the performance of a conventional poultry chiller tank as represented by FIG. 5A and an improved poultry chiller tank utilizing a side stream to introduce an antimicrobial agent as represented by FIG. 5B. In each case, an antimicrobial agent comprising PAA was introduced into a poultry chiller tank 300 with a target PAA concentration of 30 ppm in the poultry chiller tank 300. Poultry chiller tank 300 comprised a 65 foot long tank with a volume of 40,000 gallons. Poultry chiller tank 300 had a poultry carcass load of greater than 34,000 and the carcass processing rate was the same for both tests.

With the conventional poultry chiller tank as represented by FIG. 5A, a concentrated antimicrobial solution 302 was added at a carcass introduction end 304 of the poultry chiller tank 300. In the present case, antimicrobial solution 302 comprised a solution of water and PAA. During a production shift, samples of a chiller tank solution 306 were taken at the carcass introduction end 304, a carcass removal end 308 and a chiller tank midpoint 310. The time weighted average of 5 samples at each location were:

Carcass Introduction End: 35 ppm
Chiller Tank Midpoint: 26 ppm
Carcass Removal End: 15 ppm As can be seen in the sample measurements, a significant length of poultry chiller tank 300 experienced concentrations of PAA significantly below the desired level of 30 ppm. More specifically, poultry carcasses near that carcass removal end 308 were exposed to chiller tank solution having half of the desired concentration of PAA. The carcass introduction end 304 experienced a slightly higher level of PAA due to the injection of the concentrated antimicrobial solution 302 as well as PAA carryover on poultry carcasses from the prior processing step.

With the poultry chiller tank design of the present invention as show in FIG. 5B, a PAA solution 320 is introduced and mixed into a side stream 322 to form a processing solution 324 having a PAA concentration of 30 ppm. Processing solution 324 comprised a first processing solution 326 that was introduced into the chiller tank 300 at the carcass introduction end 304 while a second processing solution 328 was introduced into the chiller tank 300 at the carcass removal end 308. During a production shift, samples of the chiller tank solution 306 were taken at the carcass introduction end 304, the carcass removal end 308 and the chiller tank midpoint 310. The time weighted average of 5 samples at each location were:

Carcass Introduction End: 32 ppm
Chiller Tank Midpoint: 28 ppm
Carcass Removal End: 27 ppm As can be seen in the sample measurements, the poultry chiller tank design of the present invention had a much lower concentration gradient across the length of the poultry chiller tank 300 with the chiller tank solution 306 at the chiller tank midpoint 310 and carcass removal end 308 being much closer to the desired concentration level of 30 ppm. As measured, the poultry chiller tank design of the present invention is capable of maintaining plus or minus 3 ppm of PAA within the chiller tank solution 306 across the length of the poultry chiller tank 300.

While the design illustrated in 5B utilized introduction of only a first processing solution 326 and a second processing solution 328, processing solution 324 can be further divided into additional processing solution streams that can be introduced at additional locations within the poultry chiller tank 300. For example, processing solution 324 could be further divided into a third processing solution also having a PAA concentration of 30 ppm and said third processing solution could be introduced, for example, at the chiller tank midpoint 310.

Figure 6:
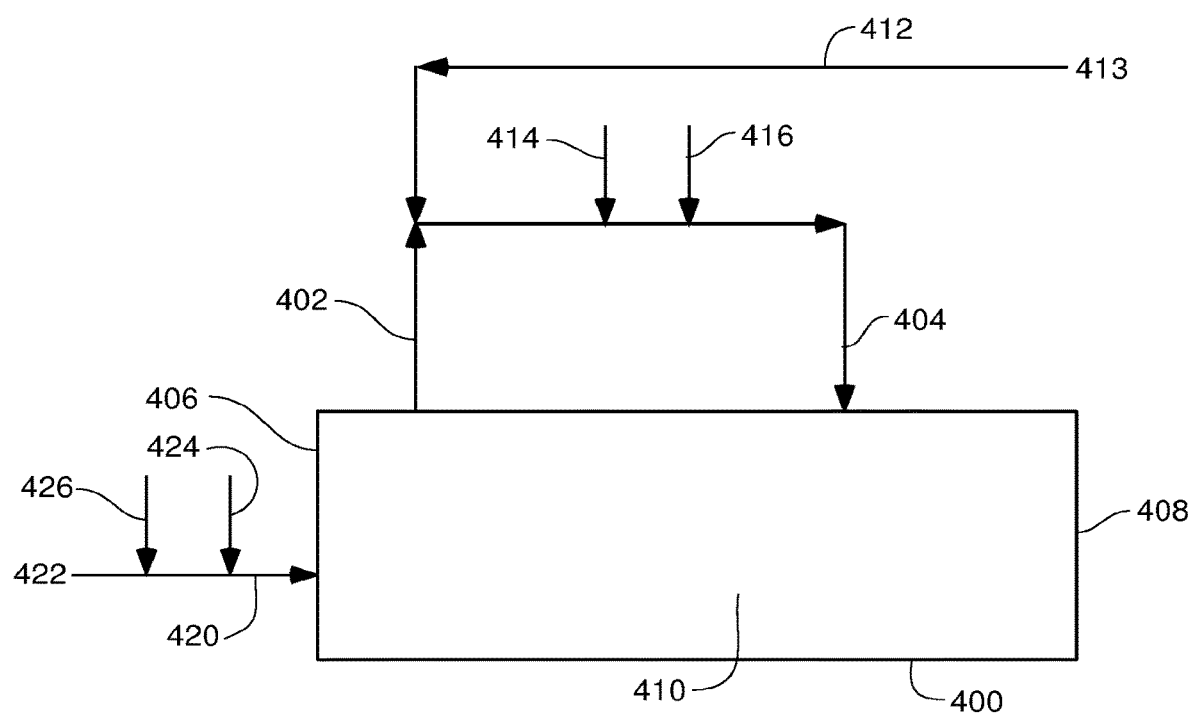
FIG. 6 is a schematic illustration of a poultry carcass water chiller tank according to a representative embodiment of the present invention.

Another representative embodiment of a poultry chiller tank 400 is illustrated generally in FIG. 6. In a manner similar to the previously described embodiments, poultry chiller tank 400 can include a recirculation line 402 for introducing a PAA solution 404 to one or more locations of the poultry chiller tank 400 between a carcass introduction end 406 and a carcass removal end 408. In addition to recirculating a tank solution 410 from the poultry chiller tank 400, a downstream processing stream 412 can be used to supply make-up water through the recirculation line 402. Downstream processing stream 412 can comprise an aqueous solution that can include an anti-microbial component, such as PAA, from a downstream operation 413, for example, a de-boning station or final rinse/bath prior to packaging, wherein the organic load is reduced as compared to the upstream poultry chiller tank 400. Recirculation line 402 can comprise a recirculation pH adjustment stream 414 as well as a recirculation PAA adjustment stream 416 such that the PAA solution 404 has a desired PAA concentration, for example, between 15 ppm and about 100 ppm, preferably between about 15 ppm and about 75 ppm, and in some other aspects between about 20 ppm and 50 ppm. In addition, poultry chiller tank 400 can comprise another source of PAA solution, for example, a fresh PAA solution 420. Fresh PAA solution 420 can comprise a tank or piping system where a source of fresh or otherwise filtered water 422 is adjusted with a fresh PAA adjustment stream 424 and/or a fresh pH adjustment stream 426 such that the fresh PAA solution 420 has a desired PAA concentration that is substantially equivalent to PAA solution 404. Through the introduction of both PAA solution 404 and fresh PAA solution 420 having equivalent PAA concentrations, the PAA concentration gradient within the poultry chiller tank 400 can be reduced.

In some aspects, the pH adjustment product is an alkalizing agent approved for direct food contact. In some aspects, the alkalizing agent is chosen from alkali metals and alkali earth metals, including sodium hydroxide and/or potassium hydroxide and/or the sodium and/or potassium salts of carbonic acid and/or phosphoric acid and/or silicic acid and/or other alkaline chemistries.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

The invention claimed is:

1. A method of processing at least a portion of one or more poultry carcasses, the method comprising:
    introducing a poultry processing solution comprising a premixed pH adjusted processing solution into a poultry processing tank from an ancillary system located outside of the poultry processing tank, the ancillary system in fluid communication with the poultry processing tank, wherein the premixed pH adjusted processing solution comprises one or more peroxycarboxylic acids and has a desired pH between 7 and 10 and a desired concentration of the one or more peroxycarboxylic acids between 1 ppm and 2000 ppm prior to being introduced into the poultry processing tank; and
    maintaining the poultry processing solution within the poultry processing tank at the desired pH between 7 and 10 and the desired concentration of the one or more peroxycarboxylic acids between 1 ppm and 2000 ppm during processing at least a portion of the one or more poultry carcasses;
    wherein the ancillary system comprises a mixing assembly configured to be in fluid communication with a source of a processing water, a reservoir of a pH adjustment product, and a reservoir of a solution of one or more peroxycarboxylic acids, wherein the mixing assembly is configured to mix an inlet stream of the processing water, an inlet stream of the pH adjustment product, and an inlet stream of the solution of one or more peroxycarboxylic acids to provide the premixed pH adjusted processing solution having the desired pH between 7 and 10 and the desired concentration of the one or more peroxycarboxylic acids between 1 ppm and 2000 ppm.

2. The method of processing at least a portion of one or more poultry carcasses of claim 1, wherein the premixed pH adjusted processing solution is continuously introduced into the poultry processing tank during processing at least a portion of the one or more poultry carcasses.

3. The method of processing at least a portion of one or more poultry carcasses of claim 1, wherein the premixed pH adjusted processing solution is continuously introduced into the poultry chiller tank to maintain the poultry processing solution within the poultry processing tank at the desired pH between 7 and 10 and the desired concentration of the one or more peroxycarboxylic acids between 1 ppm and 2000 ppm.

4. The method of processing at least a portion of one or more poultry carcasses of claim 3, wherein the solution of one or more peroxycarboxylic acids comprises peroxyacetic acid (PAA).

5. The method of processing at least a portion of one or more poultry carcasses of claim 4, wherein the desired concentration of PAA is between 10 ppm and 1000 ppm.

6. The method of processing at least a portion of one or more poultry carcasses of claim 5, wherein the pH adjustment product comprises sodium hydroxide, potassium hydroxide, or a combination thereof, and the desired pH is between 7.5 and 9.5.

7. The method of processing at least a portion of one or more poultry carcasses of claim 4, wherein the desired concentration of PAA is between 15 ppm and 200 ppm.

8. The method of processing at least a portion of one or more poultry carcasses of claim 7, wherein the pH adjustment product comprises sodium hydroxide, potassium hydroxide, or a combination thereof, and the desired pH is between 7.5 and 9.5.

9. The method of processing at least a portion of one or more poultry carcasses of claim 4, wherein the desired concentration of PAA is between 15 ppm and 100 ppm.

10. The method of processing at least a portion of one or more poultry carcasses of claim 9, wherein the pH adjustment product comprises sodium hydroxide, potassium hydroxide, or a combination thereof, and the desired pH is between 7.5 and 9.5.

11. The method of processing at least a portion of one or more poultry carcasses of claim 9, wherein the pH adjustment product is an alkalizing agent chosen from an alkali metal and an alkali earth metal, and the desired pH is between 7.5 and 9.5.

12. The method of processing at least a portion of one or more poultry carcasses of claim 4, wherein the pH adjustment product is chosen from sodium hydroxide, potassium hydroxide, sodium salt of carbonic acid, potassium salt of carbonic acid, phosphoric acid, and silicic acid.

13. The method of processing at least a portion of one or more poultry carcasses of claim 12, wherein the desired concentration of PAA is between 10 ppm and 1000 ppm.

14. The method of processing at least a portion of one or more poultry carcasses of claim 12, wherein the desired concentration of PAA is between 15 ppm and 200 ppm.

15. The method of processing at least a portion of one or more poultry carcasses of claim 12, wherein the desired concentration of the PAA is between 15 ppm and 100 ppm.

16. The method of processing at least a portion of one or more poultry carcasses of claim 1, wherein the solution of one or more peroxycarboxylic acids comprises PAA, the desired concentration of the PAA is between 10 ppm and 1000 ppm, the pH adjustment product comprises sodium hydroxide, potassium hydroxide, or a combination thereof, and the desired pH is between 7.2 and 9.5.

17. The method of processing at least a portion of one or more poultry carcasses of claim 16, wherein the desired concentration of the PAA is between 15 ppm and 200 ppm, and the desired pH is between 7.2 and 8.6.

18. The method of processing at least a portion of one or more poultry carcasses of claim 1, wherein the mixing assembly comprises a first mixing tank in fluid communication with a second mixing tank, wherein the first mixing tank is configured to mix an inlet stream of the processing water and an inlet stream of the pH adjustment product to provide a pH adjusted processing water, and wherein the second mixing tank is configured to mix an inlet stream of the pH adjusted processing water and an inlet stream of the solution of one or more peroxycarboxylic acids to provide the premixed pH adjusted processing solution having the desired pH between 7 and 10 and the desired concentration of the one or more peroxycarboxylic acids between 1 ppm and 2000 ppm.

19. The method of processing at least a portion of one or more poultry carcasses of claim 1, wherein the premixed pH adjusted processing introduced into the poultry processing tank exposes at least a portion of the one or more poultry carcasses to the poultry processing solution maintained at the desired pH between 7.2 and 9.5 and the desired concentration of the one or more peroxycarboxylic acids between 15 ppm and 200 ppm.

20. The method of processing at least a portion of one or more poultry carcasses of claim 1, wherein the premixed pH adjusted processing solution introduced into the poultry processing tank maintains the poultry processing solution within the poultry chiller tank at the desired pH between 7.2 and 9.5 and the desired concentration of the one or more peroxycarboxylic acids between 15 ppm and 200 ppm during processing at least a portion of the one or more poultry carcasses.

21. The method of processing at least a portion of one or more poultry carcasses of claim 20, wherein the poultry processing solution within the poultry chiller tank comprises a concentration of active peroxycarboxylic acid and a concentration of active peroxycarboxylic acid ion between 15 ppm and 200 ppm.

22. The method of processing at least a portion of one or more poultry carcasses of claim 1, wherein the solution of one or more peroxycarboxylic acids comprises PAA, wherein the pH adjustment product comprises sodium hydroxide, potassium hydroxide, or a combination thereof, and wherein the desired concentration of the PAA premixed pH adjusted processing solution is between 10 ppm and 200 ppm and the desired pH is between 7.5 and 9.5.

23. The method of processing at least a portion of one or more poultry carcasses of claim 22, wherein the ancillary system further comprising a pH probe proximately located the mixing assembly for measuring a pH of the premixed pH adjusted processing solution.

24. The method of processing at least a portion of one or more poultry carcasses of claim 22, further comprising a piping assembly providing fluid communication between the ancillary system and the poultry processing tank.

25. The method of processing at least a portion of one or more poultry carcasses of claim 24, wherein the poultry processing tank is a chiller tank.

26. The method of processing at least a portion of one or more poultry carcasses of claim 25, further comprising a pH probe proximately located an inflow pipe to the chiller tank for measuring pH of the premixed pH adjusted processing solution.

27. The method of processing at least a portion of one or more poultry carcasses of claim 24, further comprising a pH probe proximately located outside the chiller tank for measuring pH of the premixed pH adjusted processing solution.

28. The method of processing at least a portion of one or more poultry carcasses of claim 22, wherein the mixing assembly comprises a metering pump.

29. The method of processing at least a portion of one or more poultry carcasses of claim 22, wherein the mixing assembly comprises a venturi injector.

30. The method of processing at least a portion of one or more poultry carcasses of claim 1, wherein the poultry processing tank is a dip tank.

31. The method of processing at least a portion of one or more poultry carcasses of claim 30, further comprising a pH probe proximately located an inflow pipe to the dip tank for measuring pH of the premixed pH adjusted processing solution.

32. The method of processing at least a portion of one or more poultry carcasses of claim 30, wherein the mixing assembly comprises a metering pump.

33. The method of processing at least a portion of one or more poultry carcasses of claim 30, wherein the mixing assembly comprises a venturi injector.

34. The method of processing at least a portion of one or more poultry carcasses of claim 30, further comprising a piping assembly providing fluid communication between the ancillary system and the dip tank.

35. The method of processing at least a portion of one or more poultry carcasses of claim 1, wherein the source of the processing water comprises fresh water, recycled water, reclaimed water or reused processing solution.

36. The method of processing at least a portion of one or more poultry carcasses of claim 1, wherein the premixed pH adjusted processing introduced into the poultry processing tank eliminates an undesirable concentration gradient across the length of the poultry processing tank during processing at least a portion of the one or more poultry carcasses.

37. The method of processing at least a portion of one or more poultry carcasses of claim 1, wherein the premixed pH adjusted processing solution introduced into the poultry processing tank maintains a concentration gradient across a processing length of the poultry processing tank that is less than about 10 ppm during processing at least a portion of the one or more poultry carcasses.

38. The method of processing at least a portion of one or more poultry carcasses of claim 37, wherein the solution of one or more peroxycarboxylic acids comprises PAA, wherein the pH adjustment product comprises sodium hydroxide, potassium hydroxide, or a combination thereof, and wherein the desired concentration of the PAA premixed pH adjusted processing solution is between 10 ppm and 200 ppm and the desired pH is between 7.5 and 9.5.

39. A processing solution for processing at least a portion of one or more poultry carcasses in a poultry processing tank, the processing solution comprising:
a premixed pH adjusted processing solution comprising an aqueous solution of one or more peroxycarboxylic acids and a pH adjustment product, the premixed pH adjusted processing solution comprises one or more peroxycarboxylic acids and has a desired pH between 7 and 10 and a desired concentration of the one or more peroxycarboxylic acids between 1 ppm and 2000 ppm prior to being introduced into the poultry processing tank, the premixed pH adjusted processing solution provided by an ancillary system in fluid communication with the poultry processing tank, the ancillary system comprising a mixing assembly configured to be in fluid communication with a source of a processing water, a reservoir of the pH adjustment product, and a reservoir of the solution of the one or more peroxycarboxylic acids, wherein the mixing assembly is configured to mix an inlet stream of the processing water, an inlet stream of the pH adjustment product, and an inlet stream of the solution of the one or more peroxycarboxylic acids to provide the premixed pH adjusted processing solution having the desired pH between 7 and 10 and the desired concentration of the one or more peroxycarboxylic acids between 1 ppm and 2000 ppm, wherein the mixing assembly is proximately located outside of the poultry processing tank, wherein the mixing assembly in fluid communication with the poultry processing tank such that the premixed pH adjusted processing solution having the desired pH between 7 and 10 and the desired concentration of the one or more peroxycarboxylic acids between 1 ppm and 2000 ppm is capable of being introduced from the mixing assembly into the poultry processing tank, and wherein a continuous flow of the premixed pH adjusted processing solution introduced into the poultry chiller tank is capable of maintaining the poultry processing solution within the poultry processing tank at the desired pH between 7 and 10 and the desired concentration of the one or more peroxycarboxylic acids between 1 ppm and 2000 ppm during processing at least a portion of the one or more poultry carcasses.

40. The processing solution for processing at least a portion of one or more poultry carcasses in a poultry processing tank of claim 39, wherein the premixed pH adjusted processing solution is capable of being continuously introduced into the poultry processing tank during processing at least a portion of the one or more poultry carcasses.

41. The processing solution for processing at least a portion of one or more poultry carcasses in a poultry processing tank of claim 40, wherein the solution of the one or more peroxycarboxylic acids comprises peroxyacetic acid (PAA).

42. The processing solution for processing at least a portion of one or more poultry carcasses in a poultry processing tank of claim 41, wherein the desired concentration of PAA is between 10 ppm and 1000 ppm.

43. The processing solution for processing at least a portion of one or more poultry carcasses in a poultry processing tank of claim 42, wherein the pH adjustment product comprises sodium hydroxide, potassium hydroxide, or a combination thereof, and the desired pH is between 7.5 and 9.5.

44. The processing solution for processing at least a portion of one or more poultry carcasses in a poultry processing tank of claim 41, wherein the desired concentration of PAA is between 15 ppm and 200 ppm.

45. The processing solution for processing at least a portion of one or more poultry carcasses in a poultry processing tank of claim 44, wherein the pH adjustment product comprises sodium hydroxide, potassium hydroxide, or a combination thereof, and the desired pH is between 7.5 and 9.5.

46. The processing solution for processing at least a portion of one or more poultry carcasses in a poultry processing tank of claim 41, wherein the desired concentration of PAA is between 15 ppm and 100 ppm.

47. The processing solution for processing at least a portion of one or more poultry carcasses in a poultry processing tank of claim 46, wherein the pH adjustment product comprises sodium hydroxide, potassium hydroxide, or a combination thereof, and the desired pH is between 7.5 and 9.5.

48. The processing solution for processing at least a portion of one or more poultry carcasses in a poultry processing tank of claim 41, wherein the desired concentration of the PAA is between 15 ppm and 200 ppm, and the desired pH is between 7.2 and 8.6.

49. The processing solution for processing at least a portion of one or more poultry carcasses in a poultry processing tank of claim 41, wherein the premixed pH adjusted processing introduced into the poultry processing tank exposes at least a portion of the one or more poultry carcasses to the poultry processing solution maintained at the desired pH between 7.2 and 9.5 and the desired concentration of the PAA between 15 ppm and 200 ppm.

50. The processing solution for processing at least a portion of one or more poultry carcasses in a poultry processing tank of claim 41, wherein the premixed pH adjusted processing solution introduced into the poultry processing tank maintains the poultry processing solution within the poultry chiller tank at the desired pH between 7.2 and 9.5 and the desired concentration of the PAA between 15 ppm and 200 ppm during processing at least a portion of the one or more poultry carcasses.

* * * * *